UNITED STATES PATENT OFFICE.

ROBERT WAGNER AND JOHN J. MAIER, OF PHILADELPHIA, PENNSYLVANIA.

TANNING HIDES OR SKINS.

SPECIFICATION forming part of Letters Patent No. 574,014, dated December 29, 1896.

Application filed September 16, 1896. Serial No. 606,049. (No specimens.)

*To all whom it may concern:*

Be it known that we, ROBERT WAGNER and JOHN J. MAIER, citizens of the United States, residing in the city and county of Philadelphia, State of Pennsylvania, have invented a new and useful Improvement in Tanning Hides or Skins, which improvement is fully set forth in the following specification.

Our invention consists of a new manner of tanning hides and skins, by means of which the tanning is accomplished by a single bath, and the product is of a superior nature in that it possesses great strength and is highly flexible.

In carrying out our invention hides or skins are unhaired and prepared in the usual manner, after which they are tanned by being subjected to the action of a solution of whiting, salt, chrome-alum, saltpeter, and muriatic acid until the process is completed, when the leather is ready for coloring and finishing.

In the preferred embodiment of our invention we take ten pounds of chrome-alum, three pounds of saltpeter, six pounds of muriatic acid, fifteen pounds of salt, and ten pounds of whiting, the above ingredients being mixed with fifteen gallons of water. We preferably first mix the whiting and salt together at a temperature of about 70°, after which the other ingredients are added, and the whole mixture is then commingled with fifteen gallons of water, the skins being afterward immersed therein in the usual manner.

It will of course be understood that while we preferably employ the above ingredients in substantially the proportions enumerated the several proportions may be slightly varied, according to requirements, without departing from the spirit of our invention.

Having thus described our invention, what we claim as new, and desire to secure by Letters Patent, is—

1. A single-bath process for tanning hides and skins, which consists in subjecting the same to the action of a solution of whiting, salt, chrome-alum, saltpeter, muriatic acid and water, combined in substantially the proportions specified.

2. A composition for tanning consisting of a solution of whiting, salt, chrome-alum, saltpeter and muriatic acid, combined in substantially the proportions specified.

3. The herein-described solution for tanning, consisting of whiting, salt, chrome-alum, saltpeter and muriatic acid, the above ingredients being commingled in water.

ROBERT WAGNER.
JOHN J. MAIER.

Witnesses:
JOHN A. WIEDERSHEIM,
WM. C. WIEDERSHEIM.